United States Patent [19]

Hagenson et al.

[11] Patent Number: 5,272,195
[45] Date of Patent: Dec. 21, 1993

[54] GLASS-REINFORCED CHEMICALLY COUPLED BRANCHED HIGHER ALPHA-OLEFIN COMPOUNDS

[75] Inventors: Mary J. Hagenson; David A. Soules; Dirk M. Sutherlin; Larry M. Selby, all of Bartlesville, Okla.

[73] Assignee: Phillips Petroleum Company, Bartlesville, Okla.

[21] Appl. No.: 914,167

[22] Filed: Jul. 14, 1992

[51] Int. Cl.$^5$ .............. C08J 5/08; C08K 5/54; C08L 51/08
[52] U.S. Cl. .................. 524/188; 524/494; 524/579; 525/242; 525/244
[58] Field of Search ........ 524/188, 494, 579; 525/242, 244

[56] References Cited

U.S. PATENT DOCUMENTS

| | | | |
|---|---|---|---|
| 3,437,550 | 4/1969 | Paul, Jr. | 161/938 |
| 4,000,111 | 12/1976 | Henman et al. | 260/42.15 |
| 4,477,617 | 10/1984 | Murphy | 524/136 |
| 4,542,065 | 9/1985 | Gaa | 428/391 |
| 4,546,150 | 10/1985 | Shigemoto | 525/240 |
| 4,632,959 | 12/1986 | Nagano | 525/70 |
| 4,637,956 | 1/1987 | Das et al. | 428/391 |
| 4,663,369 | 5/1987 | Kawai et al. | 523/203 |
| 4,690,959 | 9/1987 | Plueddemann | 523/213 |
| 4,728,573 | 3/1988 | Temple | 428/378 |
| 4,871,810 | 10/1989 | Saltman | 525/133 |
| 4,888,394 | 12/1989 | Boudreaux, Jr. | 525/285 |
| 4,891,399 | 1/1990 | Ohkawa et al. | 523/200 |

FOREIGN PATENT DOCUMENTS

10139892  7/1984  European Pat. Off.

OTHER PUBLICATIONS

CertainTeed Corporation, "Chopped Strand 91B", Sales Brochure, 1985.
CertainTeed Corporation, "Chopped Strand 93B", Sales Brochure, 1989.
CertainTeed Corporation, "Chopped Strand 930", Sales Brochure, 1985.
CertainTeed Corporation, "Chopped Strand 967", Sales Brochure, 1985.
CertainTeed Corporation, "Chopped Strand 993", Sales Brochure, 1987.
Owens Corning Fiberglas Corporation, Product Bulletin for 408BC Fiberglas ®.
Owens Corning Fiberglas Corporation, Product bulletin for 457BA Fiberglas ®.
Owens Corning fiberglas Corporation, Product bulletin for 492AA Fiberglas ®.
Owens Corning Fiberglas Corporation, product bulletin for 497 Fiberglas ®.
PPG Industries, Inc., "Type 1156 Chopped Strand", Bulletin F-162D, 1984.
PPG Industries, Inc., "Type 3090 Chopped Strand", Bulletin F-179A, 1988.
PPG Industries, Inc., "Type 3540 Chopped Strand", Bulletin F-175A.
PPG Industries, Inc., "Type 3541 Chopped Strand", Bulletin F-178A.
PPG Industries, Inc., "Type 3830 Chopped Strand", Bulletin F-177A.

Primary Examiner—Paul R. Michl
Assistant Examiner—U. K. Rajguru
Attorney, Agent, or Firm—Morrison Bennett

[57] ABSTRACT

Compositions including polymers, copolymers and blends of stabilized stereoregular polymers of branched higher alpha-olefins, grafting compounds, free radical generators, glass and amino-functional silanes are provided as well as methods for making these compounds and articles thereof. These may also contain polyurethane film formers.

45 Claims, No Drawings

GLASS-REINFORCED CHEMICALLY COUPLED BRANCHED HIGHER ALPHA-OLEFIN COMPOUNDS

BACKGROUND OF THE INVENTION

This invention relates to glass-reinforced theremoplastics. Improvement of polymer properties is a dominant factor in the development and production of olefin polymers. Several methods have been employed to improve various polymer properties.

Polymers with relatively high melting points, such as stereoregular polymers of branched higher alpha-olefins, have been developed. These polymers are useful in high temperature applications such as microwave packaging. Improving the performance and/or properties of these polymers could expand the variety of uses of these polymers.

Reinforcing agents such as glass fibers can be incorporated into the polymer to improve the mechanical properties and/or the heat resistance of the polymer. However, merely mixing the glass fibers and the polyolefins together can result in weak bonding between the glass fibers and the polyolefin. One solution is to have a more bondable component grafted onto the polymers to facilitate reinforcement with glass fibers and other generally infusible reinforcing agents.

Polymers of branched higher alpha-olefins have been modified with grafting reactions to incorporate functional chemical moieties to improve the adhesion between the alpha-olefin matrix and the glass reinforcement as has been disclosed in U.S. Pat. No. 4,888,394, Dec. 19, 1989.

Glass fiber reinforcement products are usually sized either during the fiber formation process or in a post-treatment. Sizing compositions for use in treating glass fibers usually contain a lubricant, which provides the protection for the glass fiber strand; a film former or binder that gives the glass fiber strand integrity and workability; a coupling agent that provides better adhesion between the glass fiber strand and the polymeric materials which are reinforced with the glass fiber strand; and other additives such as emulsifiers, wetting agents, nucleating agents, and the like.

Sizing compositions which can be used for treating glass fibers for improved adhesion between the glass fiber strand and relatively low melting point polyolefins, such as polyethylene and polypropylene, are known. The polyolefin may be modified partially or entirely with an unsaturated carboxylic acid or derivative thereof. But there is still a need for improved adhesion between glass fibers and high melting point stereoregular polymers of branched higher alpha-olefins or stereoregular polymers of branched higher alpha-olefins which have been modified with unsaturated silanes, carboxylic acids, or derivatives thereof.

SUMMARY OF THE INVENTION

It is an object of this invention to provide glass-reinforced thermoplastic materials from which products with improved properties can be made.

It is another object of this invention to provide methods for making glass-reinforced thermoplastic materials from which products with improved properties can be made.

It is an object of this invention to provide glass-reinforced polymers of branched higher alpha-olefins with improved adhesion between the alpha-olefin matrix and the glass reinforcement and methods for making these.

In one embodiment of this invention a composition comprises:

(a) a stereoregular polymer of branched higher alpha-olefins which has been stabilized with at least one hindered phenol;

and which has been grafted with a grafting compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;

(b) glass;

(c) at least one amino-functional silane; and (d) at least one polyurethane film former.

In another embodiment of this invention a composition comprises:

(a) a copolymer of a polymer of branched higher alpha-olefins which has been stabilized with at least one hindered phenol;

and which has been grafted with a grafting compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;

(b) glass;

(c) at least one amino-functional silane; and (d) at least one polyurethane film former.

In a third embodiment of this invention a composition comprises:

(a) a blend of at least two polymers of branched higher alpha-olefins which have been stabilized with at least one hindered phenol;

and which have been grafted with a grafting compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;

(b) glass;

(c) at least one amino-functional silane; and (d) at least one polyurethane film former.

In a fourth embodiment of this invention a composition comprises:

(a) a blend of at least one polymer of another olefin which is not a branched higher alpha-olefin; and at least one polymer of branched higher alpha-olefins which has been stabilized with at least one hindered phenol and which has been grafted with a grafting compound selected from the group consisting of vinyl-polymerizable unsaturated hydrolyzable silanes, carboxylic acids; carboxylic acid derivatives; carboxylic acid anhydrides, carboxylic acid anhydride derivatives, and mixtures thereof in the presence of a free radical generator;

(b) glass;

(c) at least one amino-functional silane; and (d) at least one polyurethane film former.

In each of these four embodiments, the composition may contain additional amino-functional silane rather than a polyurethane film former.

In accordance with this invention methods are provided for making the compositions of this invention.

Also in accordance with this invention articles made from the compositions of the invention are provided.

DETAILED DESCRIPTION OF THE INVENTION

The mechanical and thermal properties and property retention characteristics of stereoregular polymers of branched higher alpha-olefins are improved by compounding with glass fibers. These polymers are further improved by chemical coupling of the polymer matrix to the glass reinforcing fibers. The resultant compounds have excellent electrical properties, high strength, and good thermal and chemical resistance, which are beneficial in a variety of automotive and electrical applications. For example, products made with the glass-reinforced polymers of this invention have exhibited significantly higher heat deflection temperatures than products made with other glass-reinforced polymers.

Surprisingly excellent mechanical and thermal properties can be obtained by (a) modifying stabilized stereoregular branched higher alpha-olefin polymers with unsaturated silanes, carboxylic acids, and/or carboxylic acid anhydrides in the presence of a free radical generator in the polymer melt, and then (b) reinforcing these modified polymers with glass which has been sized with a composition which contains at least one amino-functional silane and at least one polyurethane film former.

Similar beneficial results can be obtained when copolymers of branched higher alpha-olefin polymers or blends of branched higher alpha-olefin polymers with other branched higher alpha-olefin polymers or blends of branched higher alpha-olefin polymers with other alpha-olefins are grafted and reinforced with glass which has been sized with a composition which contains at least one amino-functional silane and at least one polyurethane film former.

Alternatively, glass which does not have at least one polyurethane film former in the sizing can be used if additional amino-functional silane is added to the mixture of glass and polymer(s), and/or copolymer(s), and-/or blends thereof.

BRANCHED HIGHER ALPHA-OLEFIN POLYMERS

The polymers useful in this invention are homopolymers and copolymers of branched higher alpha-olefins. The preferred alpha-olefin monomers have from about 5 to about 12 carbon atoms. Exemplary monomers include, but are not limited to, 3-methyl-1-butene, 3-methyl-1-pentene, 4-methyl-1-pentene, 4-methyl-1-hexane, 4,4-dimethyl-1-hexene, and other similar monomers. Most preferably, polymers of 4-methyl-1-pentene and 3-methyl-1-butene are utilized in this invention. Table 1 gives the approximate melting point for some of the homopolymers listed above.

TABLE 1

Melting Point of Some of the Exemplary Homopolymers Useful in this Invention

| Polymerized Monomer | Approximate Melting Temperature, °C. |
| --- | --- |
| 3-methyl-1-butene | 300 |
| 3-methyl-1-pentene | 365 |
| 4-methyl-1-pentene | 240 |
| 4-methyl-1-hexene | 196 |
| 4,4-dimethyl-1-hexene | 350 |

The terms "branched higher alpha-olefin polymer" and "polymers of branched higher alpha-olefins", as used in this disclosure, include homopolymers, as well as copolymers. Copolymers comprise the product resulting from combining a branched high alpha-olefin with any other olefin monomer or monomers. For example, a branched higher alpha-olefin can be polymerized in the presence of, or in series with, one or more olefin monomers. Generally, applicable comonomers have from about 2 to about 18 carbon atoms and preferably, have from about 5 to about 16 carbon atoms. Most preferably, the comonomer or comonomers are long chain alpha-olefins. Exemplary comonomers include, but are not limited to, 1-octene, 1-decene, 1-dodecene, 1-tetradecene, 1-hexadecene, and other higher olefins.

In general, it is preferred for the polymer to comprises at least about 85 mole percent derived from branched high alpha-olefins, and more preferably, at least about 90 mole percent moieties derived from branched higher alpha-olefins. Most preferably, the polymer comprises at least about 95 mole percent moieties derived from branched higher alpha-olefins, which results in a polymer or superior strength and a high melting point.

A suitable polymer composition can also be obtained by physically blending homopolymers and/or copolymers. In these blends, depending upon the properties desired and the application to be made, short linear chain olefin polymers are sometimes preferred for blending with the polymer or copolymer of branched higher alpha-olefin.

For example, for economic reasons and to improve impact properties, incorporation of polypropylene into glass reinforced polymethylpentene products is desirable. It has been discovered that blends of grafted polymethylpentene and grafted polypropylene that are reinforced with glass which has been sized with materials containing amino-functional silanes surprisingly result in compounds which can be made into articles having significantly higher heat deflection temperature than similar compounds reinforced with glass not having amino-functional silane sizing. This is uniformly so for all blend ratios of polymethylpentene and polypropylene. The heat deflection temperature of polypropylene dominant blends is limited by the 150° C. melting point of polypropylene. Similar improvement of properties can be obtained whether (a) each of the polymers is first grafted, then blended with the other; or (b) the two polymers are co-grafted (i.e., mixed together with the grafting agent or mixed together then combined with the grafting agent, with co-grafting being the presently preferred method.

In similar fashion, a branched higher alpha-olefin polymer can be blended with one or more different branched higher alpha-olefin polymers. For example, polymethylbutene can be blended with polymethylpentene in a 90:10 ratio to achieve improved economics while not compromising properties significantly.

POLYMER STABILIZING PACKAGE

After the branched higher alpha-olefin polymer has been produced, it is essential, according to this invention, that the polymer be stabilized. This can be done by giving the polymer a prophylatic charge with a hindered phenol before additional processing of the polymer. The hindered phenol acts as an antioxidant and improves the heat, light, and/or oxidation stability of the polymer. As a result of the prophylactic charge (typically less than 0.5 weight percent based on weight of the polymer), the polymer product can withstand drying and storage after the polymerization process.

Any hindered phenol in an amount which improves the heat, light, and/or oxidation stability of the polymer can be used. Exemplary hindered phenol compounds include, but are not limited to, 2,6-di-tert-butyl-4-methylphenol; tetrakis(methylene 3-(3,5-di-tert-butyl-4-hydroxyphenyl)propionate) methane; thiodiethylene bis(3-(3,5-di-tert-butyl-4-hydroxyphenyl)propionate); octadecyl 3-(3,5-di-tert-butyl-4-hydroxyphenyl)propionate; 1,3,5-tris(3,5-di-tert-butyl-4-hydroxybenzyl)isocyanurate; 1,3,5-trimethyl-2,4,6-tris(3,5-di-tert-butyl-4-hydroxybenzyl)benzene; and/or 2,2'-methylene bis(4-methyl-6-tert-butylphenol).

Preferably the hindered phenol antioxidant used for the prophylactic charge is selected from the group consisting of 2,6-di-tert-butyl-4 -methylphenol; tetrakis(methylene 3-(3,5-di-tert-butyl-4-hydroxyphenyl)propionate(methane; octadecyl 3-(3,5-di-tert-butyl-4-hydroxyphenyl)propionate; and mixtures thereof because of ease of use, availability, and economic reasons.

Other means of stabilizing the branched higher alpha-olefin polymers can be used separately or in combination with the hindered phenol.

The type(s) of stabilizer(s) used depends on the final application or use of the polymer. Numerous polymer additives are commercially available and are usually selected from the group consisting of additional hindered phenols, hindered amine light stabilizers, thioesters, aliphatic into compounds and mixtures thereof.

Thiosynergists which may be used as stabilizers for the branched higher alpha-olefin polymer include, but are mot limited to, dilaurylthiodiproprionate and distearylthiodiproprionate.

The total polymer stabilizer package that can be added prior to grafting of the polymer of branched high alpha-olefins, which comprises the essential hindered phenol antioxidant prophylatic charge, and/or additional hindered phenol, and/or one or more thiosynergists, and/or hindered amine light stabilizer, when used, is usually added to the polymer in an amount in the range of about 0.05 to about 2 parts by weight of total stabilizer(s) per 100 parts by weight of polymer (phr). Preferably, the hindered phenol prophylactic charge comprises an amount in the range of about 0.1 to about 1 phr, and most preferably in an amount in the range of about 0.1 to about 0.8 phr. If insufficient hindered phenol is present, oxidative degradation of the polymer can occur. The presence of excess hindered phenol can interfere with the grafting process. If desired, a larger amount of stabilizers, i.e., in excess of 2 phr, can be added any time after the grafting process, depending upon the desired polymer properties, and desired properties of the blend compositions and molded articles to be made therefrom.

GRAFTING COMPOUNDS

The stabilized, stereoregular polymers of branched higher alpha-olefins are modified by grafting with a radically polymerizable unsaturated grafting compound selected from the group consisting of vinyl-polymerizable unsaturated hydrolyzable silane compounds, carboxylic acids and derivatives, carboxylic and anhydrides and derivatives, and mixtures thereof, in the presence of a free radical generator.

The vinyl-polymerizable unsaturated hydrolyzable silanes which can be used in this invention contain at least one silicon-bonded hydrolyzable group, such as, for example, alkoxy, halogen, and acryloxy, and at least one silicon-bonded vinyl-polymerizable unsaturated group such as, for example, vinyl, 3-methacryloxypropyl, alkenyl, 3-acryloxypropyl, 6-acryloxyhexyl, alkyloxypropyl, ethynyl, and 2-propynyl. The silicon-bonded vinyl-polymerizable unsaturated group preferably is an ethylenically unsaturated group. Any remaining valances of silicon not satisfied by a hydrolyzable group or a vinyl-polymerizable unsaturated group are satisfied by a monovalent hydrocarbon group, such as, for example, methyl, ethyl, propyl, isopropyl, butyl, pentyl, isobutyl, isopentyl, octyl, decyl, cyclohexyl, cyclopentyl, benzyl, phenyl, phenylethyl, and naphthyl. Suitable silanes of this type include those represented by the formula:

$$R_a SiX_b Y_c$$

wherein R is a monovalent hydrocarbon group, X is a silicon-bonded hydrolyzable group, Y is a silicon-bonded monovalent organic group containing at least one vinyl-polymerizable unsaturated bond, a is an integer of 0 to 2, preferably 0; b is an integer of 1 to 3, preferably 3; c is an integer of 1 to 3, preferably 1; and a+b+c is equal to 4.

Suitable vinyl-polymerizable unsaturated hydrolyzable silanes that can be used in this invention include, but are not limited to, 3-acryloxypropyltriethoxysilane, ethylnyltriethoxysilane, 2-propynyltrichlorosilane, 3-acryloxypropyldimethylchlorosilane, 3-acryloxypropyldimethylmethoxysilane, 3-acryloxypropylmethyldichlorosilane, 3-acryloxypropyltrichlorosilane, 3-acryloxypropyltrimethoxysilane, allydimethylchlorosilane, allylmethyldichlorosilane, allytrichlorosilane, allyltriethoxysilane, allyltrimethoxysilane, chloromethyldimethylvinylsilane, [2-(3-cyclohexenyl)ethyl]dimethylchorosilane, 2-(3-cyclohexenyl)ethyltrimethoxysilane, 3-cyclohexenyltrichlorosilane, diphenylvinylchlorosilane, diphenylvinylethoxysilane, (5-hexenyl)dimethylchlorosilane, (5-hexenyl)dimethylchlorosilane, 5-hexenyltrichlorosilane, 3-methacryloxypropyldimethylchlorosilane, 3-methacryloxypropyldimethylethoxysilane, 3-methacryloxypropylmethyldiethoxysilane, 3-methacryloxypropyltrichlorosilane, methyl-2-(3-cyclohexenyl)-ethyldichlorosilane, methyl-3-(trimethylsiloxy)crotonate, 7-octenyltrichlorosilane, 7-octenytrimethoxysilane, 1-phenyl-1-trimethylsiloxyethylene, phenylvinyldichlorosilane, styrylethyltrimethoxysilane, 1,3-tetradecenyltrichlorosilane, 4-[2-(trichlorosilyl(ethyl]cyclohexene, 2-(trimethylsiloxy)ethylmethacrylate, 3-(trimethylsilyl)cyclopentene, vinyldimethylchlorosilane, vinyldimethylethoxysilane, vinylethydichlorosilane, vinylmethyldiacetoxysilane, vinylmethyldichlorosilane, vinylmethyldiethoxysilane, vinyltrimethylsilane, vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, and 3-methacryloxypropyltris(beta-methoxyethoxy)silane and mixtures thereof.

The preferred silane compounds are vinyltrichlorosilane, vinyltriethoxysilane, vinyltrimethoxysilane, vinyltris(beta-methoxyethoxy)silane, vinyltriacetoxysilane, 3-methacryloxypropyltrimethoxysilane, 3-methacryloxypropyltris(beta-methoxyethoxy)silane, and mixtures thereof. These compounds are preferred due to commercial availability, ease of use, as well as good polymer property improvement.

The radically polymerizable unsaturated grafting compound also can be a carboxylic acid or an anhydride thereof, with about three to about 10 carbon atoms, with preferably at least one olefinic unsaturation, and derivatives thereof. Examples of the carboxylic acid and anhydride include, but are not limited to, an unsaturated monocarboxylic acid such as acrylic acid or methacrylic acid; an unsaturated dicarboxylic acid such as maleic acid, fumaric acid, itaconic acid, citraconic acid, allyl succinic acid, muconic acid (mesaconic acid), glutaconic acid, norbornene-2,3-dicarboxylic acid (tradename Nadic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (tradename for norbornene-2,3-dicarboxylic anhydride), methyl Nadic anhydride, tetrahydrophthalic anhydride, or methyltetrahydrophthalic anhydride; or a mixture of two or more thereof. Of these unsaturated carboxylic acids and acid anhydrides thereof, maleic acid, maleic anhydride, Nadic acid, methyl Nadic acid, methyl Nadic anhydride, or Nadic anhydride is preferably used.

The radically polymerizable unsaturated grafting compound is present in the reaction mixture in an amount sufficient to improve the properties of the resultant grafted polymer. Usually, the amount is in the range of about 0.1 to about 2 parts of radically polymerizable unsaturated grafting compound per 100 parts of polymer (phr), preferably in the range of about 0.2 to about 1.6 phr, and most preferably in the range of about 0.4 to about 1.2 phr. If too much grafting compound is used, not all of the grafting compound will be grafted onto the polymer and no additional appreciable polymer property improvement is obtained; an excess is economically undesirable. Use of too little grafting compound does not improve or enhance the polymer properties. In general, the grafting compounds used in this invention have similar amounts of functionality.

The grafting reaction must occur in the presence of a free radical generator, also called a free radical initiator. An organic peroxide is preferably used as the free radical initiator in the graft modification reaction as described above. More specifically, preferred examples of an organic peroxide include, but are not limited to, alkyl peroxides, aryl peroxides, acyl peroxides, aroyl peroxides, ketone peroxides, peroxycarbonates, peroxycarboxylates, hydroperoxides, and other organic peroxides. Examples of an alkyl peroxide include diisopropyl peroxide; di-tert-butyl peroxide; 2,5-dimethyl-2,5-di(tert-butylperoxy)hexyne-3; a,a'-bis(tert-butylperoxy)diisopropyl benzene; and 2,5-dimethyl-2,5-di-(tert-butylperoxy)hexane. An example of an aryl peroxide is dicumyl peroxide. An example of an acyl peroxide is dilauroyl peroxide. An example of an aroyl is dibenzoyl peroxide. Examples of a ketone peroxide include methyl ethyl ketone peroxide and cyclohexanone peroxide. Examples of hydroperoxide include tert-butyl hydroperoxide and cumene hydroperoxide. Preferred examples of a free radical initiator are di-tert-butyl peroxide; 2,5-dimethyl-2,5-di(tert-butylperoxy)hexyne-3; 2,5-dimethyl-2,5-di(tert-butyl-peroxy)hexane, dicumyl peroxide; a,a'-bis(tert-butylperoxy)diisopropylbenzene; and mixtures thereof. Higher molecular weight organic peroxide compounds are preferred because they are safe and easier to handle and store, as well as being more stable at higher temperatures.

The organic peroxide is present in the grafting reaction in an amount sufficient to effectuate a grafting reaction. Usually, the amount is in the range of about 0.001 to about 5 parts of organic peroxide per 100 parts per polymer (phr), preferably in the range of about 0.001 to about 1 phr, and most preferably in the range of about 0.005 to about 0.4 phr. Too much organic peroxide can still initiate the grafting reaction, but polymer degradation, such as vis-breaking of the polymer, can occur. A concentration of organic peroxide which is too low does not initiate the grafting reaction.

AMINO-FUNCTIONAL SILANES

This invention requires the presence of at least one amino-functional silane. This can be a silane or silanes incorporated in the sizing on commercially available glass or it can be silane or silanes added to the glass in a posttreatment, added to the polymer, or added during mixing of the polymer with the glass and any other additives.

At least one of the amino-functional silanes should be an alkoxysilane containing at least one substituted or unsubstituted amino group in the molecule. The amino group can be either primary or secondary; alkoxysilanes with both a primary and a secondary amino group may also be used. The alkoxy group must be hydrolyzable and generally will be methyl, ethyl, butyl, acetyl or a group with a similar functionality.

Specific examples of amino-functional silanes presently preferred in this invention include N-(2-aminoethyl)-3-aminopropyltrimethoxysilane, N-beta-(aminoethyl)-gamma-aminopropylmethyldimethoxysilane, N-(6-aminohexyl)aminopropyl-trimethoxysilane, gamma-aminopropyltriethoxysilane, N-phenyl-gamma-aminopropyltrimethoxysilane, trimethoxysilylpropyldiethylenetriamine, 1-trimethoxysilyl-2-1(p,m-aminomethyl)phenylethane, p-aminophenyltrimethoxysilane, phenylaminoalkyltrimethoxysilane aminoethylaminomethylphenethyltrimethoxysilane, (aminoethylaminomethyl)phenyltrimethoxysilane, gamma-aminopropyltrimethoxysilane, gamma-aminopropyldimethylethoxysilane, 3-aminopropylmethyldiethoxysilane, bis[3-(triethoxysilyl)propyl]amine, bis[3-(trimethoxysilyl)propyl]ethylenediamine, 4-aminobutyldimethylmethoxysilane, and 4-aminobutyltriethoxysilane.

Presently most preferred amino-functional silanes include, but are not limited to, A-100 (gamma-aminopropyltriethoxysilane), A-1120 (N-beta-(aminoethyl)-gamma-aminopropyltrimethoxysilane), A-1160 (gamma-ureidopropyltriethoxysilane) and Y-9576 (phenylaminoalkyltrimethoxysilane), all available from Union Carbide Corporation.

In addition to the amino alkyl functional silane, most glass sizing compositions contain at least one other silane. The second organo silane coupling agent present in the aqueous chemical treating composition can be a lubricant modified amino functional organo silane coupling agent, polyamino functional organo silane coupling agent, mixtures of these and an epoxy functional organo silane coupling agent and a vinyl functional organo silane coupling agent. The lubricant modified amino functional organo silane coupling agent is available from Union Carbide under the trade designation A-1108 coupling agent. The polyamino functional organo silane coupling agent is available from Union Carbide under the trade designation A-1120.

An amount of one or more amino-functional silanes sufficient to increase the tensile strength and heat distortion temperature of articles made from the invention compositions is useful in this invention. Generally the amino-functional silane or silanes added to the glass in a posttreatment, added to the polymer, or added during mixing of the polymer with the glass and any other additives should be present in an amount in the range from about 0.01 weight percent to about 2 weight percent, based on total weight of the composition. More preferably, the amino-functional silane or silanes are present in an amount in the range from about 0.2 weight percent to about 1.0 weight percent, based on total weight of the composition. Presently, most preferably the amion-functional silanes are present in a range from about 0.3 weight percent to about 0.8 weight percent, based on total weight of the composition. Use of an insufficient amount of amino-functional silane would result in minimal improvement in properties of articles made from the invention compositions. Use of an excess of the amino-functional silane would be economically undesirable.

POLYURETHANE FILM FORMER

The sizings on the glass fibers useful in this invention are believed to contain polyurethane polymers which have proved effective in the aqueous chemical treatment of glass fibers. The polyurethane polymer traditionally is utilized in aqueous treating compositions in the form of an aqueous emulsion or latex. These have proven satisfactory in assisting in the production of treated glass fibers that have minimum breakage or unraveling of a bundle of fiber, when the fiber bundles are cut into short lengths for mixing with polymeric materials.

The polyurethane polymer can be any aqueous dispersible, emulsifiable or solubilizable polymer reaction product of a polyol, including glycols, and polyisocyanates including diisocyanates with limited formation of alophanate and biuret groups.

Nonexclusive examples of suitable polyisocyanates, which are employed to produce the polyurethane polymer used with the aqueous sizing composition of the present invention, include those having an average NCO functionality of at least about 2, such as, for example, polymethylene polyphenyl isocyanates; suitable organic diisocyanates, for example 2,3-toluene-diisocyanate, 2,6-toluene-diisocyanate, hexamethylenediisocyanate, p,p'-diphenylethanediisocyanate, p-phenylenediisocyanate, hydrogenated methylene diphenyldiisocyanate, polyisocyanate, naphthalene diisocyanate, dianisidine diisocyanate; mixtures of one or more polyisocyanates and the like.

NCO-containing prepolymers also can be used. These include the reaction products of an excess of an organic diisocyanate with polyhydroxyl-containing compounds having from 2 to about 8 OH groups per molecule such as, for example, ethylene glycol, glycerine, trimethylolpropane, pentaerylthritol, sorbitol, sucrose, mixtures thereof and/or with dihydroxyl-containing compounds such that the average hydroxyl functionality in the mixture is at least about 2.0. It is preferred that these polyurethanes are liquid; however, in the event that they are solids, or semisolids or of a relatively high viscosity such that blending with the other components would be difficult or inconvenient, they may be prepared in a suitable solvent or by melting and then emulsified into an oil-in-water emulsion with suitable surfactants.

Nonexclusuve examples of suitable polyol or dihydroxyl-containing compounds which may be used in forming the polyurethane include ethylene glycol, propylene glycol, butylene glycol, pentanediol, hexanediol, diethyleneglycol, diproylene glycol, bisphenol A, resorcinol, catechol, hydroquinone, mixtures thereof, adducts of a dihydroxyl-containing compound and a viscinal epoxy compound such as, for example, ethylene oxide, 1,2-propylene oxide, 1,2-butylene oxide, epichlorohydrin, epibromohydrin, mixtures thereof and the like. When the dihydroxyl-containing compound is a solid, it is suitable employed by either dissolving it in a suitable solvent or melting it and then converting it into an oil-in-water emulsion by use of suitable surfactants and water.

Curable, blocked polyurethane polymers which are aromatic, aliphatic or alicyclic in nature can be used. The emulsions or dispersions are formed by dissolving the polyurethane prepolymer in a nonreactive organic solvent for the polyurethane in a sufficient amount, for example 20–50 percent by weight based upon the weight of the solution, adding sufficient surfactants with the proper HLB range and then gradually mixing the solution with sufficient water to form a stable emulsion of droplets of the solution in the water. These blocked polyurethane resins are formed by the reacton of a polyisocyanate, such as toleune diisocyanate adducts of hydroxyl terminated polyether or polyester resins with an end blocking compound active hydrogen atoms such as an amide or polyamide according to conventinoal techniques for the production of polyurethane resins. The polyisocyanate can be referred to as a prepolymer, i.e., an adduct or a simple diisocyanate with a suitable polyfunctional resin.

Particularly suitable polyurethane polymers are those that are substantially aliphatic or alicyclic in nature where the majority of the polyurethane polymeric chain is constituted of aliphatic or hydrogenated aromatic, or alicyclic moieties. Particularly suitable aqueous emulsions of polyurethane polymers are "Rucothane®", latices designated as 2010L, 2020L, 2030L, 2040L, 2050L, and 2060L, available from the Ruco Chemical Corporation, New York. These materials include a thermoplastic urethane lattice having varied particle sizes and are characterized as high molecular weight aliphatic isocyanate based thermoplastic elastomers in aqueous dispersions using anionic or noninoic surfactants. The most preferred polyurethane used is one that is a carboxylated polyurethane to assist in water dispersibility. The Rucothane latices are based on aliphatic components and have a polymer solids content in stable emulsions ranging from 55–60 weight percent. The Rucothane latices have a Brookfield viscosity RVF4 in centipoise at 2 RPM ranging from 7,000 for 2060L and 2030L latices up to 25,000 for the 2020L latex.

Additional examples of polyurethane resins that can be used are the polyurethane resins available from Witco Chemical Company under the trade designation Witcobound, such as the material Witcobond W290H. This material has a solids content of between 61 and 63 percent, Brookfield viscosity (Spindle 3, 60 RPM, LVF) between 200 centipoise and 600 centipoise, a pH between 7 and 9 and a particle size of pH 5 microns. The particle charge for the W290H is anionic. Also, the Mobay XW urethane latices can be used; these are available from the Organics Division of Mobay Chemical Corporation under the trade designations XW-110, XW-111 and XW-114.

The amount of the polyurethane polymer used in the aqueous sizing composition is in the range of about 0.1 to about 10 weight percent, preferably 1 to 3 weight percent, of the aqueous sizing composition; or about 20 to about 60 weight percent of the solids of the aqueous sizing composition.

In addition to the polyurethane polymer, or a mixture of an epoxy polymer and polyurethane polymer, a copolymer of an epoxy polymer and polyurethane polymer can be used. These materials can be formed by use of polyepoxide prepolymer having one or more oxirane rings and also having open oxirane rings, which are used as hydroxyl groups for the dihydroxyl-containing compounds for reaction with diisocyanates or polyisocyantes. The isocyanate moiety opens the oxirane ring and the reaction continues as an isocyanate reaction with a primary or secondary hydroxyl group. There should be sufficient epoxide functionality on the polyepoxide resin to enable the production of an epoxy polyurethane copolymer still having effective oxirane rings. Linear polymers are produced through reactions of diepoxides and diisocyanates. The di- or polyisocyanates can be aromatic or aliphatic although the aliphatic di-or polyisocyanates are preferred for better thermal stability and non-yellowing of the chemically treated glass fibers.

The aqueous dispersion or emulsion of an epoxy polyurethane copolymer can be prepared by reacting the copolymer with a primary or secondary amine to form an epoxide-amine adduct. With the secondary amine, the reaction occurs through the amine opening the epoxide ring forming a tertiary amine and a secondary hydroxyl group. The epoxide amine adduct is solubilized and obtains a cationic character by further reaction with an acid to form a tertiary maine acid salt. Optionally a solvent such as a water-miscible solvent, nonexclusive examples of which are esters, ethers or ketones, can be employed. A suitable class of polyepoxide resins having isocyanate or polyisocyanate functionality is a polymeric material containing two or more epoxy groups per molecule. The polyepoxides are of a relatively high molecular weight of at least 350, and preferably within the range of 350 to 2,000. These polyepoxides are combined with the blocked, crosslinkable isocyanate derivatives. The blocked isocyanate derivatives. The blocked isocyanate derivatives act as crosslinking or curing agents for the polyepoxide to produce epoxy polyurethane copolymers. Types of polyepoxide polymers which can form the epoxide amine adducts are given in U.S. Pat. No. 4,148,772 (Marchetti, et al.), where the portions of this patent relating to the description of the polyepoxide polymers and the epoxide-amine adducts are incorporated herein by reference. Also the polyepoxide amine adducts which are chain extended with organic polyols with or without the use of a catalyst can be employed as taught in U.S. Pat. No. 4,148,772; those portions of this patent also hereby incorporated herein by reference.

A suitable epoxy polyurethane copolymer for the present invention is that available from Celanese Chemical Company Specialty Resins, under the trade designation CMDW 60-5520 epoxy resin dispersion. This material is an aqueous dispersion of a urethane modified epoxy resin with an epoxide equivalent weight of 540 having a solids content of 60 percent. These are no organic solvents present and the dispersion is thixotropic. The epoxy polyurethane polymer can be cured through both epoxy functionality and hydroxyl functionality. Curing agents most conveniently employed are those which are water soluble or dispersible and which are stable in aqueous media. Examples include, but are not limited to , dicyandiamide, substituted amidiazoles, aliphatic and aromatic amines, melamine resins and urea formaldehyde resins. However, it is preferred that curing agents are not used in the aqueous chemical treating composition for the film forming polymers. The amount of the epoxy polyurethane copolymer in the aqueous treating composition can be in the range of about 0.1 to about 10 weight percent and preferably from about 3 to about 7 weight percent of the aqeuous treating composition.

The amounts of the film forming polymers in the aqueous chemical treating composition can vary somewhat depending upon the polymeric matrix to be reinforced. When the epoxy polyurethane copolymer is used with the polyurethane polymer, it is preferred that the epoxy polyurethane is present in a predominant amount of the solids of the film forming materials present in the aqueous chemical treating composition. The amount of the film forming materials present in the aqueous chemical treating composition can range in an amount between about 1 and about 20 weight percent of the aqueous chemical treating composition.

REINFORCEMENT MATERIALS

The glass fiber reinforcement improves the properties, such as, for example, the mechanical and thermal properties, of articles made from the polymer. Glass reinforcments available in a variety of compositions, filament diameters and forms are useful in this invention.

Glass fiber diameters are usually given a letter designation between A and Z. The most common diameters used in glass reinforced thermoplastics are G-filament (about 9 $\mu$m) and K-filament (about 13 $\mu$m). Several forms of glass fiber products can be used for reinforcing thermoplastics. These include yarn, woven fabrics, continuous roving, chopped strand, mats, etc. Continuous filament strands are generally cut into lengths of ⅛, 3/16, ¼, ½, ¾, and 1 inch or longer for compounding efficacy in various processes and products.

The glass fibers presently preferred for use in this invention have an average cross-sectional thickness in the range from about 3 to 30 microns, preferably from about 8 to about 10 microns and have an average length in the range from about 2 to about 50 millimeters, preferably from about 2.5 to about 5 millimeters.

Any fiberous silicon oxide material can be used. Examples of types of glass include, but are not limited to, type A glass (an alkali glass), type E glass (a boroaluminosilicate), type C glass (a calcium aluinosilicate), and type S glass (a high-strength glass). Type E glass is presently preferred due to economic reasons and commerical availability.

Commercial glasses sold for use as reinforcement for use in thermoplastics are usually sized during either the fiber formation process or in a posttreatment, and thus are sold with sizing materials already incorporated.

The amount of sizing on the glass fiber product typically ranges from about 0.2 to about 1.5 weight percent based on total weight of the glass and the sizing, although loadings up to 10 percent may be added to mat products. From about 0.2 to about 0.6 weight percent of sizing compound, based on total weight of sizing compound and glass, is presently preferred for chopped strand glass fiber.

Depending upon what thermoplastic is to be used, the intended applications, and variations in glass processed by different manufacturers even for the same intended end uses, there are differences in the sizing compositions. The compositions are usually proprietary and many are not disclosed by the manufacturers.

The sizing compositions usually contain a lubricant, which provides the protection for the glass fiber strand; a film former or binder which gives the glass strand integrity and workability; and a coupling agent which provides better adhesion between the glass fiber strand and the polymeric materials that are being reinforced with the glass fiber strand. The lubricant, film former, and coupling agent can be a single compound or a mixture of two or more compounds. Additional agents which may be used in sizing compositions include emulsifiers, wetting agents, nucleating agents, and the like.

The film former is usually water soluble or wter emulsifiable during processing and must be non-sensitive to water after curing. Examples of film formers include, but are not limited to, polyesters, epoxy resins, polyurethanes, polyacrylates, polyvinyl acetates, polyvinl alcohols, styrene-butadiene latexes, starches, and the like. The presently preferred film former is polyurethane, described in another section of this application.

The coupling agent is usually a silane coupling agent that has a hydrolzable moiety for binding to the glass and a reactive organic moiety that is compatible with the polymeric material which is to be reinforced with the glass fibers. The presently preferred coupling agent is one of the amino-functional silanes describe in another section of this application.

A number of commercially available gass fiber reinforcements have been designed to produce optimum tensile strength and thermal performance in polyolefins. One such glass reinforcement product, OCF 457 BA, Owens Corning Fiberglas Corporation, is commercially available for use in chemically-coupled polypropylene. This product was also recommended by the manufacturer for use in steroregular polymers of branched higher alpha-olefins, such as polymethylpentene. It is believed that the film former in the sizing composition for OCF 457 BA glass fibers is a carboxylic styrene-butadiene latex and that the coupling agent is an amino-functional silane (3-aminopropyltriethoxysilane), although the exact composition of the sizing is not disclosed by the manufacturer. Other commercial glass reinforcements designed for optimum use in polyolefins include PPG 3830, produced by Pittsburgh Plate Glass, Pittsburgh Pa., and CertainTeed 967, produced by CertainTeed Corporation of Valley Forge, Pa. Surprisingly, when used to reinforce grafted polymethylpentene, these glasses sized for use in polyolefins, yield only moderate improvements in properties.

The glass sizing compositions for use in this invention include those which have one or more amino-functional silanes, and one or more polyuerthane film formers. Such sizing formulations are designed to give optimum results in nylon and polyethylene terephthalate (PET( resin systems, and are commercially available. Five such particularly suited commercial glass fiber reinforcements are: CertainTeed Chopped Strand 993 and Chopped Strand 93B, produced by CertainTeed Corporation of Valley Forge, Pa.; OCF 492AA, produced by Owens Corning Fiberglas Corporation, Toledo, Ohio; and PPG 3540 and PPG 3541, produced by Pittsburgh Plate Glass, Pittsburgh, Pa. Chopped Strand OCF 492AA, PPG 3540, CertainTeed 993 and 93B are G-filament glasses (about 9 $\mu$m in diameter). Chopped strand PPG 3541 is a K-filament glass (diameter about 13 $\mu$m). When these fibers are used to reinforce chemically-coupled branched higher alpha-olefins, excellent tensile strength and heat deflection are obtained.

Since glasses with this sizing composition are designed for use in nylons and polyesters, it is unexpected and surprising that they will be useful for reinforcing branched higher alpha-olefin polymers because of the difference in chemical functionality between these two different classes of polymers.

It has also been discovered that the addition of amino-functional silanes to glasses sized for use in polyolefins and which do not use polyurethane as the film former, such as OCF 457 BA, results in a significant increase in tensile strength and heat deflection temperature in grafted branched higher alpha-olefin compounds. Suitable amino-functional silanes are described in the section of that heading above. Amino-functional silanes can be mixed with the glass prior to compounding with the polymer, and/or added to the polymer melt during the compounding process.

The glass fiber reinforcement should be present in the range of about 10 to about 200 parts by weight glass fiber per hundred parts by weight of polymer (phr). Preferably, the glass fibers are present in the range of about 10 to about 120 phr, and most preferably in the range of about 10 to about 80 phr. Expressed in other terms, the glass fibers should be present in about 10 to about 67 weight percent, based on the weight of the total product. More preferably, the glass fibers are present in the range of about 10 to about 55 weight percent, and most preferably in the range of about 10 to about 45 weight percent. Using too small an amount of glass fiber does not improve the polymer properties. Having too much glass fiber results in not enough polymer to coat the glass fibers; i.e., the fibers are not "wetted out."

OTHER POLYMER ADDITIVES

Other additives, in addition to the previously discussed additives for use in the branched higher alpha-olefin polymer, can optionally be incorporated into the branched higher alpha-olefin polymer, before and/or after grafting, to achieve additionally desired beneficial polymer properties. General exemplary additives include, but are not limited to, antioxidants, antioxidant synergists, UV absorbers, additional heat stabilizers, pigments, nucleating agents, plasticizing agents, surface active agents, optical brighteners, antistatic agents, flame retardants, emulsifiers, lubricating agents, metal inhibitors, degradability additives in addition to those described above, and the like.

Processing lubricants can also be added to enhance polymer properties. Examples of processing lubricants include, but are not limited to, fatty acids containing from about 10 to about 20 carbon atoms and the metal salts thereof. Usually, metal stearates, such as, for example, calcium stearate and zinc stearate, and/or metal laurates are used as processing lubricants and/or acid scavengers for polyolefins.

Mold release agents such as low molecular weight polyethylene wax also can be used. If corrosion is a potential problem, one or more corrosion inhibitors can be added.

Usually, the total quantity of such other additives is not more than about 20 weight percent of the total weight of the composition, although higher amounts could be used if desired. Generally, an effective amount of additives is desired. Use of too large an amount of additives during grafting could interfere with the grafting reaction and/or be economically wasteful. Use of too small an amount of additives will be ineffective for the intended purpose.

COMPOSITION

The relative amounts of components of this invention are summarized in the following Table 2.

TABLE 2

Ranges of Amounts of Components in the Inventive Compositions

| Components | Quantity[a] | | |
|---|---|---|---|
| | Broad Range | Intermediate Range | Narrow Range |
| Grafted branched alpha-olefin[b] | 33-90 | 45-90 | 55-90 |
| Glass | 10-67 | 10-55 | 10-45 |
| Amino-functional silane | >0-3 | 0.01-1 | .02-0.8 |
| Polyurethane film former[c] | >0-5 | 0.01-3 | .02-0.8 |
| Stabilizers and additives | 0-20 | 0.1-10 | 0.2-1.0 |

[a]Weight percent based on total weight of the composition.
[b]The grafted branched alpha-olefin may be in a copolymer with one or more other branched alpha-olefins or with one or more other polymers or with both. A blend of two or more grafted branched alpha-olefin polymers or of grafted branched alpha-olefin polymers with one or more other olefins can also be used.
[c]The polyurethane film former may be omitted if an amino-functional silane is added to the glass in a posttreatment, added to the polymer, or added during mixing of the polymer with the glass and other additives, in the amounts of >0-5, 0.01-3, and 0.1-2 for the broad, intermediate and narrow ranges.

PREPARATION

The composition of this invention are prepared by mixing together the components in any order by any convenient means. For example, any suitable method with blender or tumbling means may be used. Examples of these methods include, but are not limited to, dry mixing in the form of a powder, wet mixing in the form of a solution or slurry, and melt extrusion compounding.

The branched higher alpha-olefin(s), the grafting agent(s), the glass, the amino-functional silane(s) and may other additional additives may be mechanically blended together in the desired proportions with the aid of any suitable mixing device conveniently used for mixing rubbers or plastics, such as, for example, a differential roll mix, a Banbury mixer, or an extruder.

In these types of methods, the branched higher alpha-olefin(s), the grafting agent(s), the glass, the silane(s) and any other components and additives used, can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point of the branched higher alpha-olefin polymer. Generally, temperatures in the range of about 260° C. to about 330° C. would be used. Melt extrusion compounding is the presently preferred method of combination for most embodiments of this invention, with temperature ranges from about 250° C. to about 270° C. for polymethylpentene and from 315° C. to about 350° C. for polymethylbutene.

Preferably the stereoregular polymer of branched higher alpha-olefins is stabilized with a hindered phenol prior to mixing with the grafting agent(s), amino-functional silane(s), glass, and other additives. For ease of operation, the initial prophylactic charge of hindered phenol is usually solution or slurry mixed with the polymer prior to drying and handling of the polymer.

Any additional stabilizers or additives and the amino-functional silane can be blended with the branched higher alpha-olefin polymer or copolymer prior to or during treatment with the grafting agent, added to the polymer melt during the filling or reinforcing process, and/or added during reprocessing of the polymer into other forms or into blend compositions. Alternatively, additional stabilizers or additives can be mixed with the glass reinforcing materials prior to or during combining with the alpha-olefin polymer or copolymer.

The presently preferred method for most embodiments of this invention is the addition of the stabilized polymer and grafting agents at the throat of the extruder, then adding glass, amino-functional silane(s), additional stabilizers and other additives to the polymer melt through a downstream feedport.

The grafting reaction must occur in the polymer melt. Thus, the temperature of the reaction is in the range from about the polymer melting point to about the polymer decomposition temperature. Preferably, the reaction temperature is in the range from about 20° C. above the polymer melting point to about the decomposition temperature of the polymer. Most preferably, the lower end of the temperature range is utilized to minimize any thermal degradation effects to the polymer.

The time required for the grafting reaction is a length sufficient for the grafting to occur. Usually, the time is in the range of about 10 seconds to about 30 hours, preferably in the range of from about 12 seconds to about 3 hours. Most preferably, the reaction time is in the range of from about 15 seconds to about 10 minutes. Shorter times, such as less than 5 minutes, are preferred to minimize thermal degradation effects to the polymer.

The grafting reaction can be carried out by either batch or continuous processes, provided that components are well dispersed and well blended. A continuous in situ grafting process is presently preferred for ease of operation. One example of a continuous process is to add the polymer(s), stabilizer(s), grafting compound(s), and free radical generator(s) to an extruder. The order of addition of the components is not critical. For example, all components can be dry mixed and then extruded. If preferred, the reactants can be added sequentially wherein, for example, the grafting reaction occurs first, then glass and additional stabilizer(s) are added downstream from the extruder. Alternatively, a batch or "two-step" process can be used. In this two-step process the stereoregular branched higher alpha-olefin polymer or polymers can be grafted in the first step by combining the essential prophylactic hindered phenol stabilizer, grafting compound(s) and from radical generator(s) in an initial pass through an extruder; then, the stabilized branched higher alpha-olefin polymer can be repackaged, stored, transported or immediately used for subsequent processing steps. Alternatively, the stereoregular higher alpha-olefin polymer or polymers are grafted during polymerization in a reactor, then stabilized, stored, transported or immediately used for subsequent processing in an extruder. Or, as noted above, the stabilized higher alpha-olefin polymer or polymers are grafted in the first zone of a melt extruder with glass and other additives added downstream.

The glass fibers can be added any time during processing after the polymer has been initially stabilized with the hindered phenol prophylactic charge. Batch and/or continuous processes can be used, as long as all components are well dispersed and well blended. A continuous process is presently preferred for ease of operation.

One example of a continuous process is to add the stabilized polymer(s), grafting compound(s), free radical generator(s), commercially available glass fibers, and optionally, one or more amino-functional silanes to an extruder. As with the grafting reaction process, the components can be added in any order. For example, all components can be dry mixed and then extruded. The glass fibers can be mixed with the branched higher alpha-olefin polymer prior to extrusion.

Alternatively, the stabilized branched higher alpha-olefins can be mixed with the grafting compound and free radical generator and fed at the extruder throat with another resin being added through the downstream feed port. Generally it is most often presently preferred to introduce the stabilized branched higher alpha-olefin polymer, the grafting compound and free radical generator into the extruder throat, then introduce the other alpha-olefin, glass, amino-functional silane, other stabilizers, colorants and other additives to the molten main phase through one or more downstream feed ports.

In another method the stabilized polymer(s) are first grafted, and additional stabilizer(s) and then glass fibers pretreated with one or more amino-functional silanes are added downstream in the extruder after the grafting reaction has taken place.

The extrudate is preferably in a strand form which can be chopped into pellets or the like as desired.

Melt extrusion compounding is the presently preferred means of producing blends. The stabilized, grafted higher alpha-olefin polymer is combined with one or more other higher alpha-olefin polymers, and/or one or more olefins other than higher alpha-olefin polymers, the glass and the amino-functional silane. Alternatively, two or more stabilized branched higher alpha-olefin polymers or copolymers, or a stabilized branched higher alpha-olefin polymer or copolymer and one or more other alpha-olefins may be blended and grafted in a one-step process wherein all components are dry mixed and then extruded.

In order to facilitate thorough mixing of the polymers and to develop the desired combination of physical properties when a blend of polymers or copolymers is used, the mechanical blending is carried out at a sufficiently high temperature to soften the polymers so that they are thoroughly dispersed and intermingled with each other. The mixing temperature will in general vary with the relative amounts of branched higher alpha-olefin(s) and other polymer or copolymer, grafting agent, glass, and amino-functional silane in the composition. Usually the material with the higher melting temperature in the composition will govern the mixing temperature selected. For example, in polymethylpentene/polypropylene blends, generally temperatures in the range of about 250° C. to about 300° C. would be used, with higher temperatures necessary for blends containing more polymers with higher melting points. Mixing is continued until an essentially uniform blend is obtained.

It has been discovered that improvements in properties of specimens injection molded using the compositions of this invention can be obtained by compounding the resins at temperatures within the narrow ranges exemplified by the examples described below. For example, when polymethylbutene which has been grafted with a carboxylic anhydride and reinforced with glass is compounded at 325° C., the impact strength, flexural modulus, tensile strength and elongation are all better than when the polymer is compounded at higher temperatures.

It has been discovered that when certain of the branched higher alpha-olefin polymers of this invention are injection molded at temperatures which are from about 15° C. to about 40° C. above the polymer melting point and below the temperature at which thermal degradation of the polymer begins, a significant improvement in properties of the molded articles can be obtained. For example, when polymethylbutene with a melt flow of 60 g/10 min and a melting point of 300° C. is grafted and reinforced with 30 weight percent, based on total weight of the composition, glass fiber with amino-functional silane sizing, then injection molded using a mold temperature from about 315° C. to about 338° C., there is significant improvement in tensile and flexural strength and increase in heat deflection temperature.

EXAMPLES

The following examples describe several embodiments of the invention and should be taken as illustrative and not restrictive.

These examples focus on the properties of injection molded samples prepared from inventive composition polymers comprising: (a) grafted branched higher alpha-olefins (maleic anhydride grafted poly(4-methyl-1-pentene), also called polymethylpentene (PMP), or maleic anhydride grafted poly(3-methyl-1-butene), also called polymethylbutene (PMB), or copolymers or blends thereof; (b) glass reinforcement, sized with amino-functional silane(s) and polyurethane film former(s), or alternately (c) the addition of minor amounts of one or more amino-functional silanes with glass reinforcements not having polyurethane film formers. The use of glass sized with amino-functional silanes and polyurethane film formers, or alternately the addition of minor amounts of amino-functional silane(s) improved the impact strength and tensile strength, and raised the heat deflection temperature of specimens molded from the invention compositions. Use of certain temperatures for processing and compounding significantly enhanced the properties of articles made from PMB samples. Molding compositions made without addition of any silane and made with addition of silanes without amino functionality were used as controls.

The polymethylpentene (PMP) used in the following examples was prepared from 4-methyl-1-pentene (4MP1) by conventional polymerization processes, such as, for example, according to those disclosed in U.S. Pat. No. 4,342,854, which is hereby incorporated herein by reference.

The polymethylbutene (PMB) used in the following examples was prepared from 3-methyl-1-butene (3MB1) by conventional polymerization processes.

The undried polymethylpentene polymer was stabilized immediately after polymerization by mixing the polymer with a solution of a hindered phenolic propylactic stabilizer, octadecyl 3-(3,5-di-tert-tert-butyl-4-hydroxyphenyl)propionate, and/or other stabilizers known in the part. See U.S. Pat. No. 4,888,394, which is hereby incorporated herein by reference. These combined solutions were then dried to remove the liquids and produce a treated, stabilized polymer. The polymethylpentene polymer had a nominal melt index of about 26 grams/10 minutes. The polymethylbutene polymer was stabilized with 2,6-di-tert-butyl-4-methylphenol (BHT) and had a nominal melt index of about 20 to 30 grams/10 minutes.

PROPERTY TESTING

Except as noted in the following individual examples, the ASTM test procedures shown in Table 3 below were utilized in the testing.

TABLE 3

| Test Procedures Used in Testing | |
| --- | --- |
| Analysis | ASTM Method Number and Conditions |
| Melt Flow Rate | D1238-86, 260° C., 5 kg load |
| Tensile Strength at Break (ksi) | D638-86, at 5 mm/min, type I test specimens |
| Elongation at Break (%) | D638-86, at 5 mm/min |
| Flexural Strength (ksi) | D790-86, 2-inch span, 1 mm/min 5" × ½" × ⅛" test specimens |
| Flexural Modulus (ksi) | D790-86, 2-inch span, 1 mm/min 5" × ½" × ⅛" test specimens |
| Izod Impact Strength, Notched and Unnotched (ft-lb/in) | D256-84 |
| Heat Deflection Temperature (°C.) | D648-82, at 264 psi load 5" × ½" × ⅛" test specimens |

EXAMPLE I

Treated, stabilized polymethylpentene (PMP) fluff with a nominal melt flow of 15–20 g/10 min was dry mixed for at least 45 minutes with 0.8 phr maleic anhydride and 0.05 phr peroxide (Vul-Cup® R from Hercules) in a drum tumbler. For further stabilization, 0.1 wt % tetrakis(methylene 3-(3,5-di-tert-butyl-4-hydroxyphenyl)proprionate)methane (an antioxidant commercially available from Ciba-Geigy as Irganox® 1010) and 0.04 wt % zinc stearate were added to the mixture and the drum was tumbled at about 25° C. (room temperature) for an additional 15 minutes. The polymer mix was then compounded in a Werner and Pfleiderer ZSK-30 twin screw extruder configured with a general purpose compounding screw with a temperature profile of 250° to 270° C., nozzle temperature of 270° C., and screw speed between 250 and 400 rpm during which extrusion grafting of the maleic anhydride onto the polymethylpentene took place. Extrudate from the two-hole die was water cooled and pelletized.

Glass (30% by weight) and Irganox® 1010 (0.5% by weight) were added to the pre-grafted polymers during a subsequent compounding on a Davis Standard 24:1 (L:D), 1.5-inch extruder. A double Dulmage screw at 90 rpm was used for complete mixing of materials. Barrel temperature profile was 500° F. at the throat, increasing to 540° F. Extrudate from the 2-hole die was cooled in a water bath and pelletized.

The specific glass used in the reinforcement in each of the runs made in this example is shown in Table 4. The glasses designated OCF 492AA, PPG 3540, PPG 3541, CertainTeed 993 and CertainTeed 93B are all sized with materials containing amino-functional silanes and polyurethane film formers; thus, runs made with these glasses were invention runs.

The pelletized compound was then formed into standard test specimen bars of 5"×½"×⅛" by injection molding with a 75-ton New Britain injection molder. Operation conditions for injection molding the test specimens were: barrel temperature, 500° to 540° F.; nozzle temperature, 540° F.; 5 second injection time, 9 second injection/hold time, 25 second cool/cure time; injection pressure, 300 psi; hold pressure, 400 psi; and mold temperature, 235° F.

The test specimen bars were tested for tensile strength, tensile elongation, notched and unnotched impact strength, and heat deflection temperature. The results are shown in Table 4 below.

TABLE 4

Properties of Glass Reinforced Maleic Anhydride Grafted Polymethylpentene Test Specimens Made Using Glasses with Various Sizing Materials

| Glass | Resin for which Glass Is Sized | Fiber Diameter | Fiber Length, inches | Number of Runs Averaged | Tensile Strength, ksi | Percent Elongation | Notched Izod, ft-lb/in | Unnotched Izod, ft-lb/in | Heat Deflection Temperature |
| --- | --- | --- | --- | --- | --- | --- | --- | --- | --- |
| Comparison Runs | | | | | | | | | |
| OCF 457-BA | polypropylene | K | 3/16 | 3 | 7.9 | 2.9 | 0.7 | 2.1 | 177° C. |
| PPG 3830 | polypropylene | K | 1/8 | 2 | 9.9 | 4.3 | 1.0 | 3.5 | 193° C. |
| CertaiTeed 967 | polypropylene | K | 3/16 | 2 | 10.2 | 4.1 | 1.0 | 3.2 | 193° C. |
| OCF 408-BC | PBT | K | 3/16 | 2 | 10.9 | 5.5 | 1.6 | 7.5 | 199° C. |
| PPG 3090 | PBT, acetal or polycarbonate | K | 1/8 | 2 | 11.3 | 5.8 | 1.6 | 8.3 | 199° C. |
| CertainTeed 930 | PBT, polycarbonate or styrenic resins | K | 1/8 | 3 | 11.7 | 5.4 | 1.4 | 7.1 | 203° C. |
| OCF 497-DB | poly(phenylene-sulfide) | K | 1/8 | 1 | 10.8 | 5.5 | 1.5 | 7.5 | 194° C. |
| Invention Runs | | | | | | | | | |
| OCF 492-AA | nylon, or PET | G | 1/8 | 4 | 13.1 | 6.0 | 1.7 | 9.2 | 208° C. |
| PPG 3540 | nylon, polyester, ABS, SAN, polystyrene or polycarbonate | G | 1/8 | 2 | 13.2 | 6.0 | 1.7 | 9.0 | 208° C. |
| PPG 3541 | nylon, polyester, ABS, SAN, SMA, polystyrene or polypropylene | K | 1/8 | 2 | 12.4 | 5.7 | 1.8 | 8.7 | 205° C. |
| CertainTeed 993 | nylon | G | 1/8 | 11 | 13.3 | 6.2 | 1.6 | 9.4 | 209° C. |

TABLE 4-continued

Properties of Glass Reinforced Maleic Anhydride Grafted Polymethylpentene
Test Specimens Made Using Glasses with Various Sizing Materials

| Glass | Resin for which Glass Is Sized | Fiber Diameter | Fiber Length, inches | Number of Runs Averaged | Tensile Strength, ksi | Percent Elongation | Notched Izod, ft-lb/in | Unnotched Izod, ft-lb/in | Heat Deflection Temperature |
|---|---|---|---|---|---|---|---|---|---|
| CertainTeed 93B | nylon | G | 1/8 | 2 | 13.0 | 6.1 | 1.7 | 8.8 | 209° C. |

As can be seen from the data shown in Table 4, maleic anhydride grafted polymetylpentene which was reinforced with glass which had at least one amino-functional silane and at least one polyurethane film former in the sizing material could be made into test specimens which demonstrated improved mechanical properties. Tensile strength, elongation, impact strength and heat deflection temperature were all significantly higher for invention runs than for comparison runs. While not wishing to be bound by theory, the inventors believe this is attributable to chemical interaction between maleic anhydride and the amino-functional silane. Presence of the polyurethane film former on the commercial glass did not interfere with the reaction, and thus did not require addition of additional amino-functional silane. It should be noted that the properties are distinctly superior to those obtained using glass sized for use in chemically coupled polyolefins.

Break surfaces were examined by scanning electron microscopy. Grafted polymethylpentene reinforced with glass sized for use in a polyolefin showed no adhesion between the glass and polymer. In contrast, when glasses sized for use in nylon were used, which have amino-functional silane and polyurethane film formers, extensive interaction and adhesion was seen between the polymer and glass fibers.

EXAMPLE II

This example shows the effects of incorporating specific silanes on properties of articles made from maleic anhydride grafted, glass reinforced PMP compounds.

The experiments were carried out in the same manner as those described in Example I with the exception that all runs were made using OCF 457BA glass fiber which does not have a polyurethane film former and which had been dry mixed with 0.5 wt %, based on total weight of the compound, silane. The silanes used in each of the runs shown in this example are described in Table 5.

TABLE 5

Silanes Used in Example II Runs

| Silane[a] | Functionality | Nomenclature |
|---|---|---|
| A-1100 | Amino | gamma-aminopropyltriethoxysilane |
| A-1120 | Amino | N-(2-aminoethyl)-3-aminopropyltrimethoxysilane |
| A-1160 | Ureido | gamma-ureidopropyltriethoxysilane |
| Y-9576 | Amino | phenylaminoalkyltrimethoxysilane |
| A-172 | Vinyl | vinyltri(2-methoxyethoxy) silane |
| A-189 | Mercapto | gamma-mercaptopropyltrimethoxysilane |
| A-174 | Methacryl | gamma-methacryloxypropyltrimethoxysilane |

[a]All silanes were supplied by Union Carbide Corporation.

Treatment with amino-functional silanes was found, in scanning electron microscopic study, to improve interfacial adhesion between the polymer matrix and glass fibers. Physical properties of test specimens made from the compounds containing various silanes are given in Table 6.

TABLE 6

Properties of Glass Reinforced[a] Maleic Anhydride Grafted
Polymethylpentene Test Specimens with Various Silanes

| Silane | Heat Deflection Temperature | Tensile Strength, ksi | Notched Izod, ft-lb/in | Unnotched Izod, ft-lb/in |
|---|---|---|---|---|
| Comparison Runs | | | | |
| None | 181° C. | 8.5 | 0.7 | 2.5 |
| A-189 | 193° C. | 9.1 | 0.8 | 3.2 |
| A-1160 | 192° C. | 9.4 | 0.8 | 2.9 |
| A-172 | 188° C. | 8.7 | 0.8 | 3.0 |
| A-174 | 200° C. | 9.6 | 0.8 | 3.2 |
| Invention Runs | | | | |
| A-1100 | 199° C. | 10.6 | 1.0 | 4.6 |
| A-1120 | 203° C. | 10.8 | 1.3 | 6.8 |
| Y-9576 | 205° C. | 11.7 | 1.4 | 7.3 |

[a]Glass used was OCF 457BA (Owens Corning Fiberglas Corporation) without polyurethane film former.

As shown in Table 6, amino-functional silanes significantly improved the physical properties relative to those of a control specimen with no silane. The most significant improvement was seen with Y-9576 (a phenylamino silane). Heat deflection temperature was increased from 181° C. to 205° C.; and tensile strength was increased from 8.5 ksi to as high as 11.7 ksi by the addition of these silanes. Improvements in impact strength were also obtained. For example, with Y-9576 treatment, the notched izod impact strength was increased from 0.7 ft-lb/in to 1.4 ft-lb/in and the unnotched izod impact was increased from 2.5 ft-lb/in to 7.3 ft-lb/in. Less dramatic but nonetheless significant increases in properties were shown in tests of invention compound specimens compared to tests of specimens made from compounds using silanes without amino-functionality. These results demonstrate that the physical properties of articles made of glass reinforced maleic anhydride grafted PMP compounds were greatly improved by thee addition of amino-functional silanes.

EXAMPLE III

This example demonstrates the efficacy of embodiments of the invention which use blends of polymethylpentene (PMP) and polypropylene as the matrix material.

Stabilized, treated PMP fluff with a nominal melt flow of 15–20 g/10 min was prepared as described in the introduction to these examples. Various ratios (as shown in Table 7 below) of the stabilized PMP fluff and PP fluff with a nominal melt flow of 12 g/10 minutes were co-grafted as follows. The polymers were dry blended with 0.8 phr maleic anhydride and 0.05 phr Vul-Cup ®R (a,a'-bis(tert-butylperoxy)diisopropylbenzene, a peroxide available from Hercules) for at least 45 minutes at room temperature in a drum tumbler.

For further stabilization, 0.1 weight percent Irganox ® 1010 (tetrakis(methylene 3-(3,5-di-tert-butyl-4-hydroxyphenyl)proprionate methane, an antioxidant available from Ciba-Geigy Corporation) and 0.04 weight percent zinc stearate were added and tumbled in the drum for an additional 15 minutes at room temperature. The mixture was compounded in a Werner & Pfleiderer ZSK-30 twin screw extruder configured with a general purpose compounding screw with a temperature profile of 240°–250° C. and nozzle temperature of 250° C. Screw speed was about 400 rpm.

A calibrated belt feeder was used to deliver 30 weight percent, based on total weight of the compound, CertainTeed 993 glass (with amino-functional silane sizing and polyurethane film formers, commercially available from CertainTeed Corporation) to the downstream feedport. Extrudate from the two-hole die was water cooled and pelletized.

The pelletized PMP/PP glass reinforced compound resin was injection molded into standard test specimens on a 75-ton New Britain Injection Molder. Barrel temperature was 500° to 540° F.; nozzle temperature was 540° F. Injection time was 5 seconds; injection/hold time was 9 seconds; and cool/cure time was 25 seconds. Injection pressure of 300 psi and hold pressure of 400 psi were used. The mold temperature was 235° F.

For purposes of comparison, similar runs were made in the same manner with the exception that OCF 457BA glass (commercially available from Owens Corning Fiberglas Corporation) which lacks the amino-functional silane and polyurethane film former of the invention was used.

Properties of test specimens were evaluated using ASTM procedures shown in Table 3 above. Results comparing invention blends of grafted glass reinforced PMP/PP with other PMP/PP blends are shown in Table 7.

polymethylpentene/grafted polypropylene blends and with properties of test specimens made from polymethylpentene/polypropylene blends which were not grafted. Runs were made using a range of blend ratios as shown in Table 8 below.

The polymethylpentene/polypropylene blends which were grafted during melt-blending (co-grafted) were prepared as follows.

PMP was polymerized, stabilized and treated as described in the introduction to these examples. This PmP fluff having a melt flow of 20 g/10 min, polypropylene (PP) fluff having a melt flow of 12 g/10 min, 0.8 wt % maleic anhydride and 0.05 wt % peroxide were dry blended in a tumbling drum for 45 minutes. For further stabilization, 0.1 wt % Irganox ® 1010 (from Ciba-Geigy Corporation) and 0.04 wt % zinc stearate were added to the blend and the drum was tumbled for an additional 15 minutes at room temperature to insure complete mixing.

The mixture was then fed to a Werner & Pfleiderer ZSK-30 twin screw extruder at the feed throat, and 30 wt %, based on total weight of the compound, CertainTeed 993 chopped glass (commercially available from CertainTeed Corporation) was added downstream using a calibrated belt feeder. The barrel temperatures of the extruder were increased from 250° C. at the throat to 270° C. at the die. The nozzle temperature was 270° C. Screw speed was adjusted between 250–400 rpm to get an overall productivity of 70–80 lbs/hr. The extrudate from the two-hole die was water cooled and pelletized.

The pelletized extrudates were then formed into stan-

TABLE 7

Comparison of Properties of Co-grafted PMP/PP Invention Blends with Co-grafted PMP/PP Control Blends

| Glass Sizing | PMP/PP Ratio | Tensile Strength, ksi | Notched Izod, ft-lb/in | Unnotched Izod, ft-lb/in | Heat Deflection Temperature |
|---|---|---|---|---|---|
| Invention[a] | 100/0 | 13.3 | 1.6 | 9.4 | 209° C. |
| Comparison[b] | 100/0 | 7.9 | 0.7 | 2.1 | 177° C. |
| Invention | 90/10 | 12.9 | 1.6 | 7.5 | 201° C. |
| Comparison | 90/10 | 9.1 | 0.8 | 2.9 | 160° C. |
| Invention | 75/25 | 10.8 | 1.4 | 4.5 | 180° C. |
| Comparison | 75/25 | 9.5 | 0.8 | 2.7 | 149° C. |
| Invention | 50/50 | 10.2 | 1.5 | 4.7 | 153° C. |
| Comparison | 50/50 | 11.5 | 1.0 | 4.5 | 148° C. |
| Invention | 25/75 | 12.1 | 1.9 | 8.2 | 154° C. |
| Comparison | 25/75 | 11.1 | 1.0 | 5.1 | 144° C. |
| Invention | 10/90 | 14.3 | 2.1 | 10.9 | 154° C. |
| Comparison | 10/90 | | | | |
| Invention | 0/100 | 14.0 | 2.2 | 10.7 | 154° C. |
| Comparison | 0/100 | 10.1 | 0.9 | 4.8 | 143° C. |

[a]The invention blends of PMP/PP in this example were reinforced with 30 wt % based on total weight of the composition CertainTeed 993 glass which had been sized with materials containing at least one amino-functional silane and at least one polyurethane film former.
[b]The control blends of PMP/PP in this example were reinforced with 30 wt % based on total weight of the composition OCF 457BA glass which had no polyurethane film former in the sizing composition, and to which no amino-functional silane was added during compounding.

Results in Table 7 show that the use of certainTeed 993, a glass sized for use in nylon resins, yielded properties superior to those of grafted polyolefin blends reinforced with OCF 457BA, which is recommended for use in chemically-coupled polypropylene. Benefits were seen throughout the entire fomulation range, in increased tensile and impact strengths, and in higher heat deflection temperatures.

EXAMPLE IV

Runs were made to compare the properties of test specimens made from polymethylpentene/polypropylene blends which had been grafted prior to blending with properties of test specimens made from co-grafted dard test specimen bars (5"×⅛"×⅛") using a 75-ton New Britain Injection Molder. The operating conditions for the injection molder were: barrel temperature 500°–540° F., nozzle temperature 540° F., 5 second injection time, 9 second injection/hold time, 25 second cool/cure time, injection/hold pressure 300–350 psi/400–450 psi, and mold temperature 100° F.

The test specimens were then tested for physical properties using ASTM test procedures listed in Table 3 above. The results are shown in Table 8.

Runs were also made using blends of PMP and PP without grafting to demonstrate the benefits of maleic anhydride grafting.

The runs were carried out in the same manner as those made with grafting, except that no maleic anhydride and no peroxide was used in preparing the composition. The blends were therefore not grafted with maleic anhydride. The results are shown in Table 8.

Blends of polymethylpentene and polypropylene in which the polymers wee each grafted prior to blending were prepared to demonstrate that the polymers used in the blends can be pre-grafted with maleic anhydride before blending to obtain good physical properties. Such pre-grafting can be done in a variety of ways as discussed in an earlier section, including polymerization in the reactor or by melt extrusion.

PMP which had been polymerized, stabilized and treated as described in the introduction to these examples with a melt flow of 20 g/10 min was grafted with maleic anhydride using 0.8 wt % maleic anhydride and 0.5 wt % peroxide (Vul-Cup ® R) according to the procedure described in Example I. Similarly, PP fluff with a melt flow of 12 g/10 min was grafted with maleic anhydride using the same process as that described in Example I, except that the ZSK-30 barrel temperature was set at 180° C. at the throat, increasing to 200° C. at the die.

The pre-grafted PMP and pre-grafted PP were then mixed with 30 wt %, based on total weight of the compound, CertainTeed 993 Glass and melt blended with a Davis Standard 24:1 L/D, 1.5-inch extruder. The double Dulmage screw was set at 90 rpm; the barrel temperature was 500° F. at the throat increasing to 540° F. at the die. The extrudates were cooled in water, pelletized, and injection molded as described for the other runs of this example. The results of testing the injection molded test specimens are shown in Table 8 below.

PMP/PP blends co-grafted with maleic anhydride exhibit highest mechanical strengths. Blends in which polymers were pre-grafted show slightly reduced properties due to two thermal exposures during two independent extrusions.

The results shown in Table 8 clearly demonstrate that the inventive composition (co-grafted or pre-grafted blends of PMP and PP with glass reinforcement having amino-functional silane and polyurethane film former have significantly higher mechanical strengths and HDT than blends of PMP and PP in which with no grafting was done.

EXAMPLE V

This example demonstrates another embodiment of the invention. A homopolymer, poly(3-methyl-1-butene), was polymerized, stabilized, grafted with maleic anhydride, and reinforced with glass sized for compatibility with nylon.

Treated, stabilized polymethylbutene (PMB) fluff with a nominal melt flow of 21.4 g/10 min was dry mixed for at least 30 minutes with 0.8 phr maleic anhydride, 0.05 phr Aztec 2,5-tri (2,5-dimethyl-2,5-di(t-butyl-peroxy)-hexyne-3 (commercially available from Catalyst Resources, Inc.), 0.1 phr zinc stearate, and for additional stabilization, 0.5 phr tetrakis(methylene 3-(3,5-di-tert-butyl-4-hydroxyphenyl) proprionate) methane (an antioxidant commercially available from Ciba-Geigy as Irganox ® 1010). For reinforcement, 30 wt % glass, based on total weight of the compound, of the kind specified in Table 9 was bag blended with the polymer mix. The polymer mix was then compounded in a Werner & Pfleiderer ZSK-30 twin screw extruder at conditions to achieve a melt temperature of about 320° C. Extrudate from the two-hole die was water cooled and pelletized.

The pelletized compound was then molded into test specimens on a 25-ton Arburg 221E Allrounder injection molding machine. Conditions for injection molding were: barrel temperature, 315°-320° C.; nozzle tempera-

TABLE 8

Properties of Grafted and Non-grafted Glass[a] Reinforced Polymethylpentene/Polypropylene Blends

| Polymer[b] | Tensile Strength, ksi | Impact Strength | | Heat Deflection Temperature |
|---|---|---|---|---|
| | | Notched Izod, ft-lb/in | Unnotched Izod, ft-lb/in | |
| 90/10 PMP/PP, co-grafted[c] | 12.9 | 1.6 | 7.5 | 201° C. |
| 90/10 PMP/PP, pregrafted[d] | 11.0 | 1.1 | 5.0 | 187° C. |
| 90/10 PMP/PP, not grafted | 5.2 | 1.2 | 4.3 | 94° C. |
| 75/25 PMP/PP, co-grafted[c] | 10.8 | 1.4 | 4.5 | 180° C. |
| 75/25 PMP/PP, pregrafted[d] | 11.3 | 1.2 | 5.0 | 178° C. |
| 75/25 PMP/PP, not grafted | 4.4 | 1.0 | 3.6 | 110° C. |
| 50/50 PMP/PP, co-grafted[c] | 10.2 | 1.5 | 4.7 | 153° C. |
| 50/50 PMP/PP, pregrafted[d] | 9.4 | 1.2 | 3.4 | 148° C. |
| 50/50 PMP/PP, not grafted | 5.2 | 1.0 | 3.5 | n.d.[e] |
| 25/75 PMP/PP, co-grafted[c] | 12.1 | 1.9 | 8.2 | 154° C. |
| 25/75 PMP/PP, pregrafted[d] | 8.4 | 1.1 | 3.5 | 146° C. |
| 25/75 PMP/PP, not grafted | 5.3 | 1.1 | 3.6 | n.d. |
| 10/90 PMP/PP, co-grafted[c] | 14.3 | 2.1 | 10.9 | 154° C. |
| 10/90 PMP/PP, pregrafted[d] | 10.0 | 1.4 | 5.4 | n.d. |
| 10/90 PMP/PP, not grafted | 4.7 | 1.1 | 3.9 | n.d. |
| 0/100 PMP/PP, co-grafted[c] | 14.0 | 2.2 | 10.7 | 154° C. |
| 0/100 PMP/PP, pregrafted[d] | 10.8 | 1.7 | 6.8 | n.d |
| 0/100 PMP/PP, not grafted | 4.9 | 1.1 | 3.9 | n.d. |

[a]All blends were reinforced with 30 wt % CertainTeed 993 glass with amino-functional silanes and polyurethane film formers in the sizing (commercially available pretreated from CertainTeed Corporation).
[b]PMP used was treated and stabilized with a hindered phenol prophylactic charge prior to grafting and/or blending. PMP with a melt flow of 20 g/10 min was used.
PP used was obtained from Phillips Petroleum Company as a fluff with a melt flow of 12 g/10 min.
[c]PMP/PP was grafted with maleic anhydride during melt-blending of the PMP and PP in one pass through the extruder.
[d]Both the PMP and PP were separately pre-grafted with maleic anhydride prior to blending and reinforcing.
[e]n.d. = not determined.

The data shown in Table 8 indicate that up to 25 phr of PP can be added to the PMP and very high heat deflection temperatures (HDTs) (over 170° C.) are maintained. Addition of greater than 25 phr PP results in test specimens which exhibit HDTs similar to those of PP (about 154° C.). The results also show that ture, 320° C; 5-second injection time, 5-second hold time, 18-second cool time; 550 psi injection pressure; and mold temperature, 95° C.

The test specimen bars were tested in accordance with the ASTM test procedures shown in Table 3. Results of the testing of specimens with different kinds of reinforcement glasses are shown in the following Table 9.

TABLE 9

PMB Grafted with Maleic Anhydride and Reinforced with Glass Having at Least One Amino-Functional Silane

|  | Glass[a] | | | | | |
|---|---|---|---|---|---|---|
|  | Comparison Runs | | | Invention Runs | | |
|  | OCF 457-BA[b] | PPG 3830[c] | CT 967[d] | OCF 492-AA[e] | PPG 3540[f] | CT 93B[g] |
| Tensile strength, psi | 7890 | 10080 | 9540 | 12810 | 11800 | 12140 |
| Notched Izod impact strength, ft-lb/in | 0.8 | 1.1 | 1.0 | 1.4 | 1.0 | 1.2 |
| Unnotched Izod impact strength, ft-lb/in | 3.3 | 5.7 | 2.3 | 6.4 | 5.9 | 5.3 |
| Heat deflection temperature, °C. at 264 psi | 160 | 184 | 191 | 196 | 195 | 198 |
| Flow rate, g/10 min | 33 | 41 | 34 | 18 | 17 | 18 |

[a]The grafted PMB homopolymer was reinforced with 30 wt %, based on total weight of the composition, of glass.
[b]OCF 457BA is a glass sized for use in polypropylene and is commercially available from Owens Corning Fiberglas Corporation.
[c]PPG 3830 is a glass sized for use in polypropylene and is commercially available from PPG Industries.
[d]CT 967 is "Chopped Strand 967" glass sized for use in polypropylene and is commercially available from CertainTeed Corporation.
[e]OCF 492AA is glass sized for use in nylon with at least one amino-functional silane in the sizing material. OCF is commercially available from Owens Corning Fiberglas.
[f]PPG 3540 is a glass sized for use in nylon with at least one amino-functional silane in the sizing material. PPG 3540 is commercially available from PPG Industries.
[g]CT 93B is "Chopped Strand 93B" glass sized for use in nylon with at least one amino-functional silane in the sizing material. CT 93B is commercially available from CertainTeed Corporation.

The data in Table 9 show that maleic anhydride grafted PMB compounds have higher heat deflection temperatures and lower melt flow rates when reinforced with glass having at least one amino-functional silane than when reinforced with glass sized for propylene. These unexpected results are very beneficial because of process stability concerns related to PMB as a consequence of its high melting point.

EXAMPLE VI

This example demonstrates how properties of articles made from the polymer compositions of this invention are improved by compounds at temperatures lower than 325° C.

PMB was polymerized, stabilized, treated, maleic anhydride grafted, and glass reinforced as described in Example V. The PMB used has a fluff flow rate of 32.0 g/10 min. CertainTeed 93B glass fiber with amino-functional silane in the sizing was used at a loading level of 30 weight percent, based on total weight of the compound.

A range of temperatures was used to evaluate the effect of compounding at different temperatures on properties of articles made from the invention resin.

Pellets from the extruder were injection molded as described in Example V above. The injection molded test specimens were tested using the ASTM procedures listed in Table 3. Results are shown in Table 10.

TABLE 10

Effect of Compounding Temperature on Grafted PMB[a] Compositions

|  | Melt Temperature, °C. | | | | |
|---|---|---|---|---|---|
|  | 315 | 321 | 322 | 331 | 347 |
| Tensile strength, psi | 11,660 | 11,030 | 10,660 | 9,380 | 8,530 |
| Elongation, % | 3.8 | 3.5 | 3.4 | 2.9 | 2.8 |
| Flexural strength, psi | 15,070 | 14,050 | 13,140 | 11,730 | 11,520 |
| Flexural modulus, ksi | 1,160 | 1,170 | 1,080 | 1,040 | 1,090 |
| Unnotched Izod impact strength, ft-lb/in | 4.6 | 3.7 | 3.6 | 3.4 | 2.8 |
| Heat deflection temperature at 264 psi, °C. | 203 | 203 | 200 | 206 | 204 |
| Flow rate, g/10 min | 21 | 26 | 35 | 80 | 173 |
| Flow rate as molded, g/10 min | 69 | 76 | 95 | 200 | 342 |

[a]PMB used had a fluff flow rate of 32.0 g/10 min, grafted with maleic anhydride and reinforced with 30 wt % CertainTeed 93B chopped strand glass.

As shown in in Table 10, tensile and flexural strengths as well as impact resistance decreased as compounding temperatures were increased. Flow rate increased with increase in compounding temperature. Heat deflection temperature and flexural modulus both appeared to be minimally affected by the compounding temperature within the limits evaluated. The compounding temperature which afforded the best properties resulted in a melt temperature of only 15° C. higher than the melt transition temperature of PMB. Trails of compounding at lower melt temperatures resulted in processing difficulties, which suggested that a melt temperature of 315° C. is probably a practical low limit for the processing window of PMB compounds.

EXAMPLE VII

This example demonstrates the injection molding temperature range which was discovered to significantly improve the properties of glass reinforced maleic anhydride grafted polymethylbutene articles. Polymethylbutene homopolymer was anhydride grafted according to the methods described in Example V above and reinforced with CertainTeed 93B chopped strand glass, commercially available from CertainTeed Corporation with sizing containing at least one amino-functional silane. The glass was 30 wt % of the total weight of the reinforced polymer resin.

The extruded reinforced polymer pellets had a flow rate of 60 g/10 min and a melting point of 300° C.

Injection molded test specimens were tested according to the ASTM test procedure given in Table 3 and exhibited the properties shown in Table 11.

was 320° C. Injection time was five seconds; injection/hold time was five seconds; and cool/cure time was eighteen seconds. Injection pressure of 550 psi and mold temperature of 95° C. were used.

Test specimens were tested using ASTM procedures shown in Table 3 above. Results of the tests are shown in Table 12.

TABLE 11

Properties of PMB$^a$ Samples Injection Molded at Different Temperatures

| | Melt Temperature$^b$, °C. | | | | | |
|---|---|---|---|---|---|---|
| | 308 | 315 | 338 | 349 | 364 | 379 |
| Tensile strength, psi | 9,880 | 10,110 | 10,800 | 9,240 | 7,490 | 5,350 |
| Elongation, % | 2.3 | 2.5 | 2.7 | 2.3 | 2.0 | 1.5 |
| Flexural strength, psi | 12,630 | 13,100 | 13,300 | 12,180 | 10,230 | 7,230 |
| Flexural modulus, ksi | 1,170 | 1,120 | 1,080 | 1,080 | 960 | 720 |
| Unnotched Izod impact strength, ft-lb/in | 2.7 | 3.8 | 3.6 | 4.2 | 3.4 | 3.1 |
| Heat deflection temperature at 264 psi, °C. | 179 | 198 | 212 | 213 | 190 | 154 |
| Flow rate of "as molded" specimen, g/10 min. | 86 | 103 | 119 | 271 | 721 | 1,617 |

$^a$PMB used had a fluff flow rate of 32.0 g/10 min, grafted with maleic anhydride and reinforced with 30 wt % CertainTeed 93B chopped strand glass. Flow rate of resulting pellets was 60 g/10 min.
$^b$Measured under molding conditions.

TABLE 12

Properties of Amino-functional Glass Reinforced, Grafted PMB/PMP Blends

| PMB/PMP Ratio | Tensile Strength, ksi | Percent Elongation | Flexural Strength, ksi | Flexural Modulus, ksi | Impact Strength | | Heat Deflection Temperature at 264 psi, °C. | Heat Deflection Temperature at 66 psi, °C. | Flow Rate g/10 min |
|---|---|---|---|---|---|---|---|---|---|
| | | | | | Notched Izod, ft-lb/in | Unnotched Izod, ft-lb/in | | | |
| 100/0 | 10.1 | 2.50 | 13.1 | 1120 | 1.1 | 3.8 | 198 | >260 | 60 |
| 90/10 | 10.1 | 2.46 | 13.1 | 1140 | 1.0 | 3.9 | 192 | >260 | 77 |
| 75/25 | 10.1 | 2.46 | 13.4 | 1070 | 1.2 | 3.8 | 195 | 238 | 114 |
| 50/50 | 9.6 | 2.53 | 13.2 | 990 | 1.2 | 4.0 | 190 | 232 | 223 |

The test made of the injection molded specimens clearly demonstrated that properties of articles made from PMB glass reinforced compounds are optimized at melt temperatures of 315°-338° C.

EXAMPLE VIII

This example demonstrates the improvements in heat deflection temperatures which can be obtained by using a blend of PMP and PMB as the matrix resin in this invention.

PMP and PMB polymer fluff which had been stabilized with a hindered phenolic charge as described at the beginning of these examples was used. The PMP fluff had a nominal melt flow of 18 g/10 min and the PMB had a nominal melt flow of 32 g/10 min. Various ratios (as shown in Table 12) of the PMP and PMB polymer fluff were dry mixed in a tumbler for at least 45 minutes with 0.5 phr Irganox ® 1010 (antioxidant), 0.1 phr zinc stearate, 0.8 phr maleic anhydride, 0.05 phr Aztec ® 2,5-Tri (2,5-dimethyl-2,5-di(t-butyl-peroxy)-hexyne-3. The polymer mix was then bag mixed with 30 weight percent CertainTeed 93B glass (a glass commercially available from CertainTeed Corporation with amino-functional silane in the sizing), and compounded in a Werner & Pfleiderer ZSK-30 twin screw extruder configured with a general purpose compounding screw.

The mixture was compounded in the extruder at conditions to achieve a melt temperature of 320° C. Extrudate from the two-hole die was water cooled and pelletized.

The pelletized PMB/PMP resin was injection molded into standard test specimens on a 25-ton Arburg 221E Allrounder injection molding machine. Barrel temperature was 315° to 320° C.; nozzle temperature The results shown in Table 12 demonstrate that PMB can be blended with 10 weight percent PMP, then compounded with the components of this invention to prepare materials which retain the mechanical properties of PMB without a loss in heat resistance (as indicated by the low load heat deflection temperature). The only mechanical property of the grafted, glass reinforced PMB significantly affected by increasing amounts of PMP is the low load heat deflection temperature. Thus blends can be tailored to heat resistance requirements, although practical limits would probably be restricted to about 50 weight percent PMP since a PMP compound itself has a low load heat deflection temperature of about 230° C.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A composition comprising:
   (a) a stereoregular polymer of branched, 5-12 carbon atom alpha-olefins which has been stabilized with at least one hindered phenol and which has been grafted with a compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;
   (b) glass;

(c) at least one amino-functional silane and
(d) at least one polyurethane film former.

2. A composition as recited in claim 1 wherein said amino-functional silane is one selected from the group of N-(2-aminoethyl)-3-aminopropyltrimethoxysilane, N-beta-(aminoethyl)-gamma-aminopropylmethyldimethoxysilane, N-(6-aminohexyl)aminopropyl-trimethoxysilane, gamma-aminopropyltriethoxysilane, N-phenyl-gamma-aminopropyltrimethoxysilane, trimethoxysilylpropyldiethylenetriamine, 1-trimethoxysilyl-2-1(p,m-aminomethyl)phenylethane, p-aminophenyltrimethoxysilane, phenylaminoalkyltrimethoxysilane aminoethylaminomethylphenethyltrimethoxysilane, (aminoethylaminomethyl)phenyltrimethoxysilane, gamma-aminopropyltrimethoxysilane, gamma-aminopropyldimethylethoxysilane, 3-aminopropylmethyldiethoxysilane, bis[3-(triethoxysilyl)propyl]amine, bis[3-trimethoxysilyl)propyl]ethylenediamine, 4-aminobutyldiomethylmethoxysilane, and 4-aminobutyltriethoxysilane.

3. A composition as recited in claim 2 wherein said amino-functional silane is phenylaminoalkyltrimethoxysilane.

4. A composition as recited in claim 2 wherein said amino-functional silane is N-(2-aminoethyl)-3-aminopropyltrimethoxysilane.

5. A composition as recited in claim 2 wherein said amino-functional silane is gamma-aminopropyltriethoxysilane.

6. A composition as recited in claim 1 wherein said stereoregular polymer of branched alpha-olefins is a polymer of a monomer selected from the group of 4-methyl-1-pentene, 3-methyl-1-butene, 3-methyl-1-pentene, 4-methyl-1-hexene, 4,4-dimethyl-1-hexene, and mixtures thereof.

7. A composition as recited in claim 6 wherein said stereoregular polymer of branched alpha-olefins is a polymer of 4-methyl-1-pentene.

8. A composition as recited in claim 6 wherein said stereoregular polymer of branched alpha-olefins is a polymer of 3-methyl-1-butene.

9. A composition as recited in claim 1 wherein said grafting compound is a vinyl-polymerizable unsaturated hydrolyzable silane selected from the group of 3-methacrylpropyltrimethoxysilane, vinyltrichlorosilane, vinyltriethoxysilane, vinyltrimethoxysilane, vinyltris(beta-methoxyethoxy)silane, vinyltriacetoxysilane, 3-methacryloxypropyltris(beta-methoxyethoxy)silane, and mixtures thereof; and
wherein said free radical generator is selected from the group of alkyl peroxides, aryl peroxides, acyl peroxides, aroyl peroxides, ketone peroxides, peroxycarbonates, peroxycarboxylates and hydroperoxides.

10. A composition as recited in claim 9 wherein said grafting compound is 3-methacrylpropyltrimethoxysilane.

11. A composition as recited in claim 1 wherein said grafting compound is selected from the group of carboxylic acids, carboxylic anhydrides, carboxylic acid derivatives and carboxylic acid anhydride derivatives; and
wherein said free radical generator is selected from the group of alkyl peroxides, aryl peroxides, acyl peroxides, aroyl peroxides, ketone peroxides, peroxycarbonates, peroxycarboxylates and hydroperoxides.

12. A composition as recited in claim 1 wherein said stereoregular polymer of branched alpha-olefins is a polymer of 4-methyl-1-pentene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is N-(2-aminoethyl)-3-aminopropyltrimethoxysilane.

13. A composition as recited in claim 1 wherein said stereoregular polymer of branched alpha-olefins is a polymer of 4-methyl-1-pentene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is gamma-aminopropyltriethoxysilane.

14. A composition as recited in claim 1 wherein said stereoregular polymer of branched alpha-olefins is a polymer of 4-methyl-1-pentene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is phenylaminoalkyltrimehoxysilane.

15. A composition as recited in claim 1 wherein said stereoregular polymer of branched alpha-olefins is a polymer of 3-methyl-1-butene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is N-(2-aminoethyl)-3-aminopropyltrimethoxysilane.

16. A composition as recited in claim 1 wherein said stereoregular polymer of branched alpha-olefins is a polymer of 3-methyl-1-butene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is gamma-aminopropyltriethoxysilane.

17. A composition as recited in claim 1 wherein said stereoregular polymer of branched alpha-olefins is a polymer of 3-methyl-1-butene;
wherein said grafting compound is one selected from the group of vinyl-polymerizable unsaturated hydrolyzable silanes, carboxylic acids, carboxylic acid derivatives, carboxylic acid anhydrides, carboxylic acid anhydride derivatives, and mixtures thereof; and
wherein said amino-functional silane is phenylaminoalkyltrimethoxysilane.

18. A composition as recited in claim 1 wherein said stereoregular polymer of branched alpha-olefins is present in an amount ranging from about 33 weight percent to about 90 weight percent, based on total weight of the composition;
  wherein said glass is present in an amount in the range of about 10 to about 67 weight percent based on total weight of the composition; and
  wherein said amino-functional silane is present in a finite amount up to about 3 weight percent based on total weight of the composition.

19. A composition as recited in claim 1 wherein said stereoregular polymer of branched alpha-olefins is present in an amount ranging from about 45 weight percent to about 90 weight percent, based on total weight of the composition;
  wherein said glass is present in an amount in the range of about 10 to about 55 weight percent based on total weight of the composition;
  wherein said amino-functional silane is present in the range from about 0.01 to about 1 weight percent based on total weight of the composition.

20. A composition as recited in claim 1 wherein said stereoregular polymer of branched alpha-olefins is present in an amount ranging from about 55 weight percent to about 90 weight percent, based on total weight of the composition;
  wherein said glass is present in an amount in the range of about 10 to about 45 weight based on total weight of the composition;
  wherein said amino-functional silane is present in a range from about 0.02 to about 0.8 weight percent based on total weight of the composition.

21. A composition as recited in claim 1 wherein said stereoregular polymer of branched alpha-olefins is present in an amount ranging from about 33 weight percent to about 90 weight percent, based on total weight of the composition;
  wherein said glass is present in an amount in the range of about 10 to about 67 weight percent based on total weight of the composition;
  wherein said amino-functional silane is present in a finite amount up to about 3 weight percent based on total weight of the composition; and
  wherein said polyurethane film former is present in a finite amount up to about 5 weight percent based on total weight of the composition.

22. A composition as recited in claim 1 wherein said stereoregular polymer of branched alpha-olefins is present in an amount ranging from about 45 weight percent to about 90 percent, based on total weight of the composition;
  wherein said glass is present in an amount in the range of about 10 to about 55 weight percent based on total weight of the composition;
  wherein said amino-functional silane is present in the range from about 0.01 to about 1 weight percent based on total weight of the composition; and
  wherein said polyurethane film former is present in the range from about 0.01 to about 3 weight percent based on total weight of the composition.

23. A composition as recited in claim 1 wherein said stereoregular polymer of branched alpha-olefins is present in an amount ranging from about 55 weight percent to about 90 weight percent, based on total weight of the composition;
  wherein said glass is present in an amount in the range of about 10 to about 45 weight percent based on total weight of the composition;
  wherein said amino-functional silane is present in a range from about 0.02 to about 0.8 weight percent based on total weight of the composition; and
  wherein said polyurethane film former is present in the range from about 0.02 to about 0.8 weight percent based on total weight of the composition.

24. A composition as recited in claim 1 wherein said stereoregular polymer of branched alpha-olefins is a copolymer.

25. A composition as recited in claim 24 wherein said copolymer is a copolymer of 4-methyl-1-pentene and 1-decene.

26. A blend comprising:
  (a) at least two stereoregular polymers of branched, 5–12 carbon atom alpha-olefins which has been stabilized with at least one hindered phenol and which has been grafted with a compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;
  (b) glass;
  (c) at least one amino-functional silane and
  (d) at least one polyurethane film former.

27. A blend as recited in claim 26 wherein at least one of said two or more stereoregular polymers of branched alpha-olefins is a polymer of 4-methyl-1-pentene; and
  wherein at least one of said two or more stereoregular polymers of branched alpha-olefins is a polymer of 3-methyl-1-butene.

28. A blend as recited in claim 26 further comprising at least one polyurethane film former.

29. A blend as recited in claim 28 wherein at least one of said two or more stereoregular polymers of branched alpha-olefins is a polymer of 4-methyl-1-pentene; and
  wherein at least one of said two or more stereoregular polymers of branched alpha-olefins is a polymer of 3-methyl-1-butene.

30. A composition comprising:
  (a) a stereoregular polymer of branched, 5–12 carbon atom alpha-olefins which has been stabilized with at least one hindered phenol and which has been grafted with a compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof in the presence of a free radical generator;
  (b) polypropylene;
  (c) glass;
  (d) at least one amino-functional silane and
  (e) at least one polyurethane film former.

31. A composition as recited in claim 30 wherein said stereoregular polymer of branched alpha-olefins is a polymer of 4-methyl-1-pentene.

32. A method for improving the thermal performance of branched higher alpha-polymers, said method comprising admixing:
  (a) a stereoregular polymer of branched, 5–12 carbon atom alpha-olefins which has been stabilized with at least one hindered phenol;
  (b) a grafting compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof;

(c) a free radical generator;

(d) glass;

(e) at least one amino-functional silane and (f) at least one polyurethane film former.

33. A method as recited in claim 32, said method further comprising additionally admixing:

(f) at least one polyurethane film former.

34. A method for improving the impact strength of branched higher alpha-olefin polymers, said method comprising admixing:

(a) a stereoregular polymer of branched, 5-12 carbon atom alpha-olefins which has been stabilized with at least one hindered phenol;

(b) a grafting compound selected from the group consisting of vinyl-polymerizable unsaturated hydrolyzable silanes, carboxylic acids, carboxylic acid derivatives, carboxylic acid anhydrides, carboxylic acid anhydride derivatives, and mixtures thereof;

(c) a free radical generator;

(d) glass;

(e) at least one amino-functional silane and (f) at least one polyurethane film former.

35. A method as recited in claim 34, said method further comprising additionally admixing:

(f) at least one polyurethane film former.

36. A process as recited in claim 32 wherein said glass is pretreated with at least one of said at least one amino-functional silane prior to combination with other components.

37. A process as recited in claim 34 wherein said glass is pretreated with at least one of said at least one amino-functional silane prior to combination with other components.

38. An article of manufacture made from the composition of claim 1.

39. An article of manufacture made from the composition of claim 24.

40. An article of manufacture made from the composition of claim 26.

41. An article of manufacture made from the composition of claim 36.

42. An article of manufacture produced by the method of claim 32.

43. An article of manufacture produced by the method of claim 33.

44. An article of manufacture produced by the method of claim 34.

45. An article of manufacture produced by the method of claim 35.

* * * * *